United States Patent
Rao et al.

(10) Patent No.: US 11,531,928 B2
(45) Date of Patent: Dec. 20, 2022

(54) MACHINE LEARNING FOR ASSOCIATING SKILLS WITH CONTENT

(71) Applicant: Microsoft Technology Licensing, LLC, Redmond, WA (US)

(72) Inventors: Shivani Rao, Mountain View, CA (US); Deepak Kumar Dileep Kumar, Sunnyvale, CA (US); Zhe Cui, Greenbelt, MD (US); Bonnie Bills, Livermore, CA (US); SeyedMohsen Jamali, Sunnyvale, CA (US); Siyuan Zhang, San Jose, CA (US); Gungor Polatkan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1008 days.

(21) Appl. No.: 16/024,826

(22) Filed: Jun. 30, 2018

(65) Prior Publication Data
US 2020/0005194 A1    Jan. 2, 2020

(51) Int. Cl.
*G06N 20/00*    (2019.01)
*G06N 5/04*    (2006.01)
*G06F 16/40*    (2019.01)

(52) U.S. Cl.
CPC ............. *G06N 20/00* (2019.01); *G06F 16/40* (2019.01); *G06N 5/04* (2013.01)

(58) Field of Classification Search
CPC ........... G06N 5/04; G06N 20/00; G06F 16/40
See application file for complete search history.

(56) References Cited

U.S. PATENT DOCUMENTS

| 10,528,874 | B2* | 1/2020 | Appel | H04L 51/216 |
| 2008/0313000 | A1* | 12/2008 | Degeratu | G06Q 10/105 |
| | | | | 705/320 |
| 2013/0110498 | A1* | 5/2013 | Bekkerman | G06Q 50/01 |
| | | | | 704/9 |

(Continued)

OTHER PUBLICATIONS

"Natural Language Toolkit", Retrieved from : https://www.nltk.org/, Retrieved Date: Nov. 17, 2018, 2 Pages.

(Continued)

*Primary Examiner* — Kamran Afshar
*Assistant Examiner* — Ryan C Vaughn
(74) *Attorney, Agent, or Firm* — Nicholson De Vos Webster & Elliott LLP (57) ABSTRACT

Techniques are provided for using machine learning techniques to associate skills with different content. In one technique, multiple classifications models are trained. Each classification model corresponds to a different skill and is trained based on textual embeddings of a plurality of content items and labels indicating whether each content item is associated with the skill that corresponds to that classification model. A particular content item embedding is generated based on text from a particular content item. The particular content item embedding is applied to the classification models to generate multiple results. One or more results of the multiple results are identified that indicate that one or more corresponding skills are associated with the particular content item. For each result of the one or more results, skill tagging data are stored that associate the particular content item with a particular skill that corresponds to that result.

20 Claims, 4 Drawing Sheets

(56) References Cited

U.S. PATENT DOCUMENTS

| | | | | |
|---|---|---|---|---|
| 2013/0259375 A1* | 10/2013 | Dunlop | ............... | G06V 20/35 382/173 |
| 2015/0242979 A1* | 8/2015 | Abts | ............... | G06Q 50/2057 705/328 |
| 2016/0180248 A1* | 6/2016 | Regan | ............... | G09B 5/00 706/12 |
| 2017/0076225 A1* | 3/2017 | Zhang | ............... | G06N 20/00 |
| 2017/0132510 A1* | 5/2017 | Paluri | ............... | H04L 67/10 |
| 2017/0293675 A1* | 10/2017 | York | ............... | G06N 20/00 |
| 2018/0012120 A1* | 1/2018 | Daniel | ............... | G10L 15/16 |
| 2018/0181544 A1* | 6/2018 | Zhang | ............... | G06Q 10/1053 |
| 2018/0261118 A1* | 9/2018 | Morris | ............... | G09B 7/02 |
| 2018/0268023 A1* | 9/2018 | Korpusik | ............... | G06F 40/30 |
| 2018/0293908 A1* | 10/2018 | Wang | ............... | G06V 30/373 |
| 2019/0057310 A1* | 2/2019 | Olmstead | ............... | G06F 40/284 |
| 2019/0220547 A1* | 7/2019 | Chen | ............... | G06Q 50/2057 |

OTHER PUBLICATIONS

"REDIS", Retrieved from : https://redis.io/, Retrieved Date: Feb. 28, 2019, 1 Page.

McCurdy, et al., "Redis Python Client", Retrieved from https://github.com/andymccurdy/redis-py, Retrieved Date: Feb. 28, 2019, 9 Pages.

Medelyan, Alyona, "NLP keyword extraction tutorial with RAKE and Maui", Retrieved from https://www.airpair.com/nlp/keyword-extraction-tutorial, 2014, 8 Pages.

Rose, et al., "Automatic keyword Extraction from Individual Documents", Retrieved from https://pdfs.semanticscholar.org/5a58/00deb6461b3d022c8465e5286908de9f8d4e.pdf?_ga=2.78430100.1254769952.1551334475-1054585193.1528809370, Mar. 4, 2010, 18 Pages.

Sharma, et al., "Python Implementation of the Rapid Automatic Keyword Extraction Algorithm using NLTK", Retrieved from : https://github.com/csurfer/rake-nltk. Retrieved Date: Feb. 28, 2019, 3 Pages.

Cui, et al., "Video to Skill Tagging Using Transcripts under Weak Supervision", In the Books of Workshop on Learning with Limited Labeled Data, 31st Conference on Neural Information Processing Systems, Dec. 2017, 8 Pages.

\* cited by examiner

MACHINE LEARNING FOR ASSOCIATING SKILLS WITH CONTENT

TECHNICAL FIELD

The present disclosure relates to machine learning and, more particularly, to using machine learning to automatically tag various content with appropriate skills.

BACKGROUND

The Internet has allowed the proliferation of knowledge to accelerate in multiple ways. One of those ways includes a media sharing platform where content providers can upload their respective media items (e.g., video, audio) to the media sharing platform and end users can navigate to that platform to view the content using their respective computing devices (e.g., laptop, smartphone, etc.). However, with hundreds, thousands, and even tens of thousands of media items to choose from, it is difficult for users to know which media items are the most relevant. Also, it is difficult for the media sharing platform to know which media items to suggest to different users. Techniques have been developed to attempt to learn which media items are related to each other based on common consumption by various users. While such techniques are better than randomly guessing which media items to suggest to a user, the results of those techniques still suffer from relatively low user interaction.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically tagging content items with skills using one or more machine learning techniques are provided. In one approach, multiple classification models are trained, one for each skill. A media item is represented by an embedding that is generated based on text associated with the media item. The embedding is applied to each of the classification models to generate multiple results. Based on the results, the content item is automatically associated with one or more skills. In this way, manual tagging of media items is avoided. Also, this approach is useful where a text transcript of the media item (such as a ten-minute video) is available.

In another approach, a skill embedding is generated based on text of a particular skill. A token embedding is generated for each of multiple tokens associated with a content item. For each token embedding, multiple similarity type metrics are computed between the token embedding and the skill embedding. The metrics are input to a classification model to generate a result that indicates whether the particular content is associated with the particular skill. This approach is useful where very little text is associated with a content item, such as a title or short description.

System Overview

Figure 1:
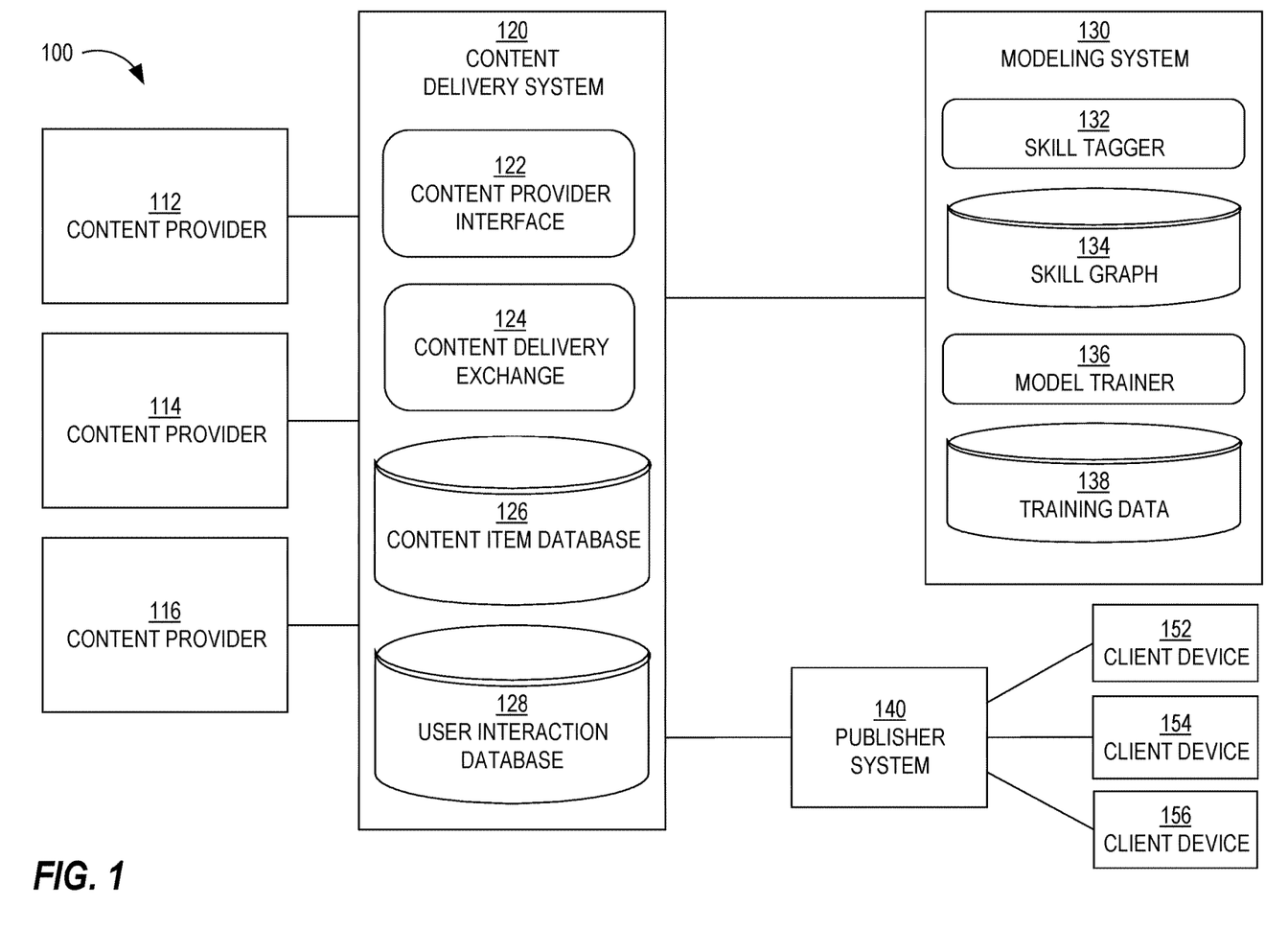
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 140, and client devices 152-156. Although three content providers are depicted, system 100 may include more or fewer content providers. Similarly, system 100 may include more than one publisher and more or fewer client devices.

Content providers 112-116 interact with content delivery system 120 (e.g., over a network, such as a LAN, WAN, or the Internet) to enable content items to be presented, through publisher system 140, to end-users operating client devices 152-156. Thus, content providers 112-116 provide content items to content delivery system 120, which in turn selects content items to provide to publisher system 140 for presentation to users of client devices 152-156. However, at the time that content provider 112 registers with content delivery system 120, neither party may know which end-users or client devices will receive content items from content provider 112.

A content item contains any type of digital content, such as text, audio, video, and graphics. A content item may contain multiple types of digital content. For example, a user that requests to view a content item may be presented with a video (of that content item) and a transcript of the video. A "media item" is a type of content item that at least contains audio data and/or video data.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to upload their respective content items, (2) a content delivery exchange 124 that conducts content item selection events in response to content requests from one or more publisher systems, such as publisher system 140, and (3) a content item database 126 that stores content items (uploaded by content providers 112-116) and, optionally, their respective summaries.

Publisher system 140 may provide its own content to client devices 152-156 in response to requests initiated by users of client devices 152-156. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 140 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher system 140 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 140 or by the client device that requested the original content from publisher system 140. For example, a web page that the client device renders includes one or more calls (or HTTP requests) to content delivery exchange 124 for one or more content item summaries. In response, content delivery exchange 124 provides (over a network, such as a LAN, WAN, or the Internet) one or more particular content items to the client device directly or through publisher system 140. In this way, the one or more particular content item summaries may be presented (e.g., displayed) concurrently with the content requested by the client device from publisher system 140.

In response to receiving a content request, content delivery exchange 124 initiates a content item selection event that involves selecting one or more content item summaries (from among multiple content item summaries) to present to the client device that initiated the content request.

Content delivery system 120 and publisher system 140 may be owned and operated by the same entity or party. Alternatively, content delivery system 120 and publisher system 140 are owned and operated by different entities or parties.

Examples of client devices 152-156 include desktop computers, laptop computers, tablet computers, wearable devices, video game consoles, and smartphones.

Content Item Selection Events

As mentioned previously, a content item selection event is when multiple content item summaries (e.g., from different content delivery campaigns) are considered and a subset selected for presentation on a computing device in response to a request. Thus, each content request that content delivery exchange 124 receives may trigger a content item selection event. Each selected content item summary may be viewed as a recommendation to consume (e.g., view/listen to) the corresponding content item.

For example, in response to receiving a content request, content delivery exchange 124 analyzes attributes of multiple content items to determine whether attributes associated with the content request (e.g., attributes of a user that initiated the content request, attributes of a computing device operated by the user, current date/time) satisfy selection criteria associated with each of the analyzed content items. If so, the content item is considered a candidate content item. One or more filtering criteria may be applied to a set of candidate content items to reduce the total number of candidates.

As another example, users are assigned to (or associated with) content items "off-line"; that is, before content delivery exchange 124 receives a content request that is initiated by the users. For example, when a content item is uploaded based on input from a content provider, one or more computing components may compare one or more attributes of the content item with attributes of many users to determine which users are to be presented with the content item (or a summary thereof). If a user's attributes satisfy selection criteria associated with the content item, then the user is assigned to a target audience of the content item. Thus, an association between the user and the content item is made. Later, when a content request that is initiated by the user is received, all the content items that are associated with the user may be quickly identified, in order to avoid real-time (or on-the-fly) processing of the selection criteria. Some of the identified content items may be further filtered based on, for example, the content item being deactivated due to subsequently appearing on a blacklist or removed by the corresponding content provider.

A final set of candidate content items may be ranked based on one or more criteria, such as predicted click-through rate (CTR) of the summaries, objective measures of quality of the content items (or their respective summaries) (e.g., actual CTR and/or predicted CTR of each content item summary, popularity of each content item among other users, user ratings of each content item), and frequency capping (which limits how often a content item summary is presented to the same person).

In one embodiment, content delivery exchange 124 conducts one or more content item selection events. Thus, content delivery exchange 124 has access to all data associated with making a decision of which content item(s) to select, including an identity of an end-user to which the selected content item summaries will be presented, an indication of whether a content item summary was already presented to the end-user, and a predicted CTR of each content item summary.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Skill Tagging Content Items

In order to present content item summaries that are relevant to a user, it is important to know in what types of content the user is interested. One way to do that is by (A) determining in which skills the user might be interested and (B) associating content items with the correct skills. If a user specifies which skills the user is interest in obtaining/developing (and, thus, step (A) is given), then only step (B) remains. However, content delivery system 120 may store thousands or tens of thousands of content items, some of which may contain many pages of text or many minutes of video. Manually tagging each content item with one or more skills would be impractical. Also, even if an army of human taggers was available, it would be nearly impossible to ensure that they are consistent in how they tag. Instead, each human tagger would apply his/her own standard of what skills are taught by a content item or are gained by consuming the content item. Furthermore, with tens of thousands of known skills, it would be impossible for any human tagger to keep those skills in mind when analyzing each content item. Thus, the skill tagging coverage would likely be incomplete.

Thus, machine learning approaches to tagging content items with skills are provided. The machine learning approach ensures that a single "standard" is applied. Also, the machine learning approach is scalable and is not sensitive to the number of content items to be tagged or the number of candidate skills.

The utility of a machine learning approach largely depends on the training data. The more accurate the training data, the more accurate the models will be in making predictions/classifications. Accurate training data depends on the accuracy of the skill tags associated with each content item.

In an embodiment, system 100 includes a modeling system 130 that has access to content item database 126 (or a version thereof) and includes a skill tagger 132 and (optionally) a skill graph 134 that is used for skill tag augmentation, described in detail below. Skill tagger 132 is implemented in hardware, software, or any combination of hardware and software.

Tagging a content item involves associating a content item with a skill tag. A skill tag associates the content item with a particular skill. A skill tag may comprise the text of a skill, such as "Java" for the skill of knowing how to program in the Java® programming language. For a particular skill, there may be multiple text versions, some being more descriptive than others. Alternatively, instead of a human interpretable textual description, a skill tag may comprise an alphanumeric value (e.g., "a236hjg") that has no apparent meaning but that is associated with one or more textual tokens that describe the corresponding skill. For example, "Java," "Java programming", and "Java programmer" may all be associated with the same skill tag (e.g., "786304").

In an embodiment, skill tags may be limited to a skill taxonomy that is based on entity profiles, each of which includes one or more user-provided skills. The skills may have been provided by the user (through a computing device) that created the entity profile and/or by other users that are socially connected to the user through an online social network. An entity profile may be a user profile or an organization/group profile. Each user profile may be associated with a list of friends or connections. Publisher system 140 may provide user interfaces that collectively allow a user with an account to create and edit a user profile, connect to other users who have accounts, send messages to those other users, view other users' profiles, view organization (e.g., company) profiles, view/comment/share/like content published by other users/organizations, and perform searches, such as people searches, organization searches, job searches, video searches, etc.

In an embodiment, one or more selection criteria are used to add a skill to a skill taxonomy and, thus, should be considered for tagging one or more content items. One example selection criterion is a number of instances of a skill among user profiles. For example, if a skill is listed in over one hundred user profiles, then the skill is added to the skill taxonomy. Another example selection criterion pertains to who lists a skill. For example, in order to be added to the skill taxonomy, a skill must be listed in at least ten profiles of users who have over five hundred connections or users who are otherwise deemed authentic or trustworthy. As another example, if over twenty job postings include a particular skill as a requirement for a job, then the particular skill is added to the skill taxonomy.

Skill tagging may be performed in one of multiple ways: manually, augmentation, and propagation. Manually tagging involves a user manually associating a content item with a skill tag (or skill name/description that is mapped to a skill tag). Augmentation and propagation are automatic approaches to tagging a content item. While one skill tagger 132 is depicted, different skill taggers may be used; for example, one skill tagger for skill tag augmentation and another skill tagger for skill tag propagation. In an embodiment, some content items are tagged only manually while other content item items are tagged only automatically. In a related embodiment, some content items are tagged manually and automatically.

Skill Tag Augmentation

In an embodiment, a content item that is already associated with a first skill is automatically associated with a second skill that is associated with the first skill. This is referred to as "skill tag augmentation." Skill associations or skill graph 134 are used to perform skill tag augmentation. For example, for each skill tag that is already associated with a content item (such as manually determined skill tags), skill graph 134 is used to identify one or more skills that are similar to the skill of the skill tag. Each identified skill is used to automatically generate a positive training instance for the corresponding model.

Skill graph 134 may take any form, such as a list or table of skill associations, each skill association consisting of two or more skills. Skill graph 134 may be indexed such that, given a skill, the appropriate skill association may be looked up in one read or a couple of reads, thus avoiding a scan (e.g., a table scan) of skill graph 134.

Skill graph 134 may be generated based on cooccurrence of skills in different entity profiles. If, for example, 90% of user profiles that include a first skill also include a second skill, then a skill association between the first skill and the second skill is created and stored. An example of considering cooccurrence is PMI (or point-wise mutual information), which is a measure of association used in information theory and statistics. As another example, two skills in skill graph 134 may be associated with each other using a cosine similarity measure that is computed from textual embeddings produced by another deep learning system.

Skill Tag Propagation

In embodiment, skill tags of a first content item are associated with a second content item based on both content items being established as similar. This is referred to as "skill tag propagation." Skill tag propagation allows for the automatic generation of additional training instances to train one or more classification models. A content item that is associated with skill tags from another content item may or may not already be associated with one or more skill tags. A content item that is already associated with one or more skill tags may have been associated with those skill tags through manual tagging and, optionally, skill tag augmentation.

Content item similarity may be determined in one or more ways. For example, a user with familiarity with two content items may manually associate two or more content items. As another example, if two content items share the same set of attributes, such as author, content provider, top N automatically determined topics, narrator, etc., then the two content items are considered similar. As another example, textual embeddings generated for two content items may be compared using one or more techniques, such as cosine similarity and Euclidean distance. If, for example, the Euclidean distance between two textual embeddings is below a particular threshold, then the corresponding content items are considered similar. Also, if the cosine similarity of two textual embeddings is within a certain threshold (e.g., 2 degrees), then the corresponding content items are considered similar and can benefit from skill tag propagation.

Model-Per-Skill Approach

Once a set of content items is tagged with one or more skills, there are two machine learning approaches that may be used to leverage the tagged content items in order to automatically tag other content items: a model-per-skill approach and a single model approach.

In the model-per-skill approach (or the multi-model approach), a textual embedding is generated for each media item that is associated with text. The text of a media item may be a transcript of audio of the media item (which may be a video or audio file). A transcript of a media item may have been provided by a content provider that uploaded the media item to content delivery system 120. The transcript may have been composed manually by a representative or employee of the content provider. Alternatively, a transcript of a media item may have been automatically generated (e.g., by content delivery system 120) using an audio-to-text analyzer that is implemented in hardware, software, or any combination of hardware and software.

A transcript may comprise multiple transcripts for different content items. For example, a video course may comprise ten videos, each video being associated with a different transcript. A transcript for the video course may be automatically formed by concatenating the ten transcripts. As another example, an audio course may comprise seven "chapters," each chapter being associated with a different transcript. Thus, a transcript for the audio course may be automatically formed by concatenating the seven transcripts.

The transcript is input to a textual embedding generator that generates a textual embedding based on the transcript. Each textual embedding that the generator outputs may be the same length or size even though the corresponding transcripts are based on different text lengths. For example, each textual embedding comprises an array or vector of entries (e.g., one hundred and forty entries), each entry corresponding to a different latent dimension. Textual embedding generation is described in more detail below.

Data Preprocessing

In an embodiment, given text, such as a transcript, one or more data preprocessing steps are performed on the transcript performing extracting embedded features from the text. Example data preprocessing steps include removing stop words (e.g., "a", "and", "but", "how", "or", and "what"), punctuations, and common words. For example, "narrator" and "instructor" may be considered common words since they tend to appear in many video transcripts.

Unlike traditional documents, video/audio transcripts are based on oral presentations and, thus, are more informal, which makes preprocessing more important. Other example data preprocessing steps include TF-IDF-based removal and NLTK. TF-IDF (or term frequency—inverse document frequency) is a numerical statistic that reflects how important a word is to a document in a collection or corpus. NLTK (or Natural Language Toolkit) is a suite of libraries and programs for symbolic and statistical natural language processing (NLP) for English written in the Python® programming language.

Different preprocessing steps may be used to remove different types of words. For example, TF-IDF-based removal may be used to remove words such as "hello," "great," "eh," and "uh" whereas an NLTK may be used to remove non-noun words.

Textual Embedding Generation

A textual embedding is generated based on a transcript or a version of a transcript that has been processed by one or more preprocessing steps. Thus, the transcript from which a textual embedding is generated may have no non-noun words, stop words, or punctuations.

Multiple techniques may be used to generate a textual embedding for a transcript that is associated with a content item. Example techniques include Latent Dirichlet Allocation (LDA) and Latent Semantic Analysis (LSI) methods that produce a probability distribution of topics. Other example techniques include Name Entity Recognition with NLTK and keyword extraction using RAKE (Rapid Automatic Keyword Extraction) and TextRank. Other example techniques include Bag-of-Words and Doc2Vec. Doc2Vec is an unsupervised algorithm that generates vectors (embeddings) for sentence/paragraphs/documents. The algorithm is an adaptation of Word2Vec that generates vectors (embeddings) for words. The vectors generated by Doc2Vec can be used for tasks like finding similarity between sentences, paragraphs, or documents.

Model Per Skill: Training

In the model per skill approach, multiple classification models are trained using one or more machine learning techniques. Example machine learning techniques include logistic regression, Support Vector Machines (SVMs), Decision trees, and K-Nearest Neighbors. Each classification model (or "skill classifier") corresponds to a different skill. Modeling system 130 includes a model trainer 136 that trains each skill classifier based on a different portion of training data 138. The training is performed based on multiple media items that are already associated with (or tagged with) one or more skill tags, each skill tag corresponding to a skill. A trained skill classifier may comprise a different weight or coefficient corresponding to each entry in an embedding.

Training data 138 for training multiple skill classifiers may be visualized as a matrix where each row corresponds to a different media item and each column corresponds to a different skill. Thus, each row is associated with a textual embedding that is generated based on a transcript of the corresponding media item. Each column is associated with a different skill. The value in each entry of the matrix indicates whether the corresponding media item is associated with the corresponding skill (e.g., 0 or 1). Each skill classifier corresponds to a different column (and, thus, a different skill) and each training instance of that skill classifier comprises a textual embedding of a media item and a value indicating whether the media item is associated with the skill of that classification model. Thus, training data for a skill classifier for the skill "Java" may comprise just a single column from the matrix, where each entry indicates whether the corresponding media item is associated with that skill. Therefore, if there are 1,000 labeled media items and 8,000 skills, then 8,000 skill classifiers are trained and the training data for each skill classifier comprises 1,000 training instances.

In an embodiment, training data for a particular skill include negative examples indicating that one or more content items are not associated with the particular skill. Such a skill is referred to as a "negative skill" with respect to those one or more content items. Determining that a content item is not associated with a particular skill may be performed manually and/or automatically. An example automatic approach involves a variation of the skill augmentation approach. For example, a content item that is associated with a first skill is identified. The first skill is used to identify a location/node within a skill graph (if composed of nodes and edges). Then, the skill graph is traversed a certain number of edges from the identified location to arrive at another node. It may be safe to assume that, after the certain number of edge traversals, the resulting node corresponds to a skill that is very dissimilar to the first skill. In an embodiment, negative skills are added randomly rather than methodically.

Additionally or alternatively, skill embeddings (generated using, for example, Word2Vec) of two skills may be used to determine whether the two skills are very different (e.g., in Euclidean distance or cosine similarity). If so, then a negative label is found for both skills.

In populating the matrix, each content item may be considered sequentially or in parallel. For example, all entries in the matrix are initialized to a value (e.g., 0) that indicates that each media item is not yet associated with any of the skills. Then, given a content item, one or more skill tags that are associated with the content item are identified. For each entry in the matrix that corresponds to one of the identified skill tags, that entry is set a value (e.g., 1) that indicates that the content item is associated with the skill that corresponds to the skill tag. For each content item that is associated with a negative skill, the corresponding entry in the matrix is set to a value (e.g., −1) that indicates that the content item is not associated with that skill. Alternatively, no augmentation is used for negative skills.

Model-Per-Skill: Scoring

Once the multiple classification models are trained, the classification models may be applied to media items, at least some of which are not reflected in the training data. For each media item that has not been "scored" with respect to a skill, a textual embedding is generated based on text (e.g., a transcript) associated with that media item (or is retrieved from memory or storage if a textual embedding has already been generated). The technique to generate the textual embedding may be the same technique that was used to generate the textual embeddings used in training data 138.

A single textual embedding of a to-be-scored media item is input into each of multiple classification models. Each classification model generates an output value (e.g., a value between 0 and 1) that reflects a prediction of whether the corresponding media item should be associated with the skill tag of the classification model. Thus, if there are 8,000 classification models, then a textual embedding of a single media item will result in 8,000 output values. If an output value from a classification model indicates that the corresponding media item is associated with the skill associated with the classification model, then the media item is automatically tagged with that skill.

Model-Per-Skill Process

Figure 2:
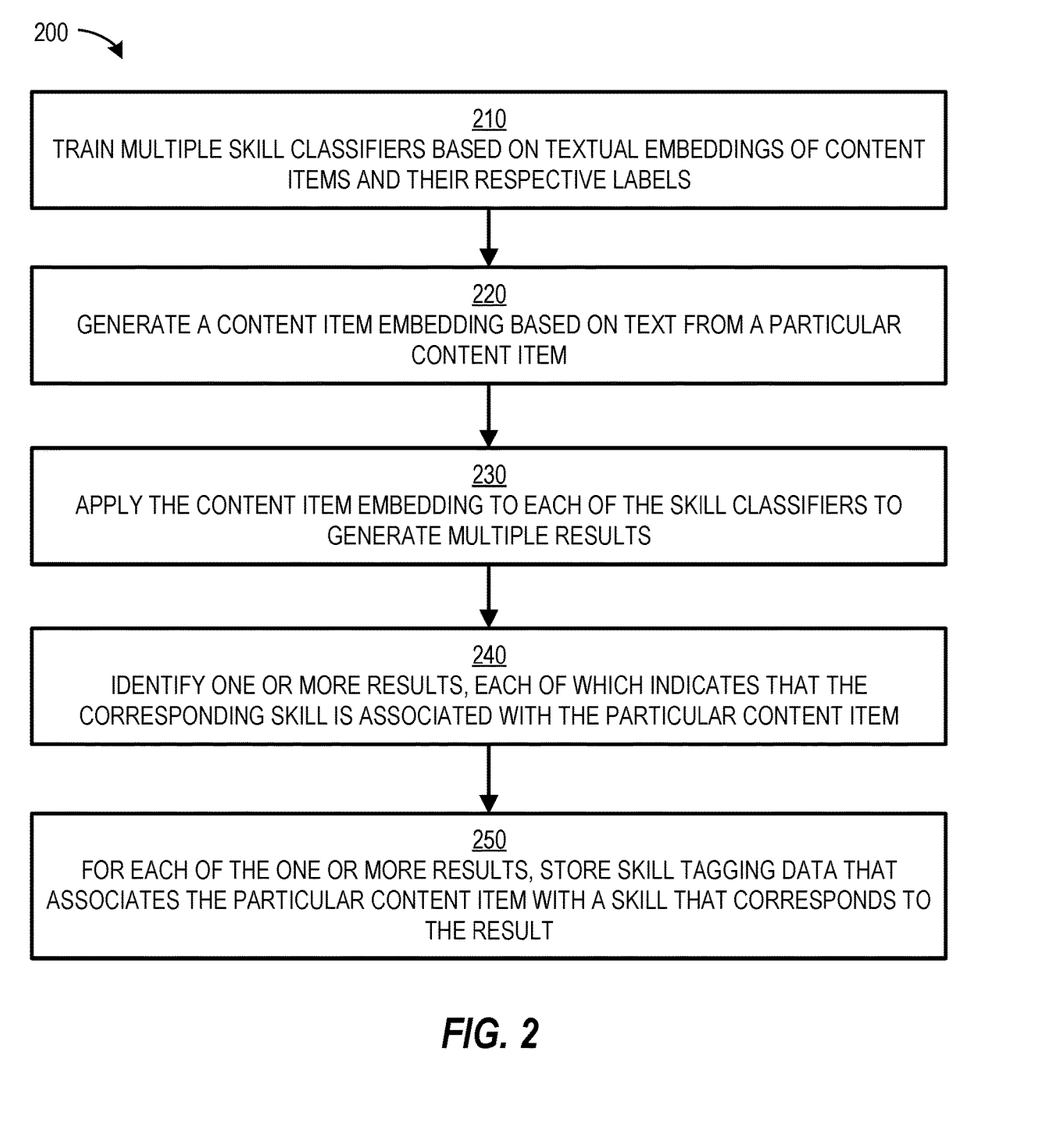
FIG. 2 is a flow diagram that depicts a process for automatically associating skills with content items using one approach, in an embodiment.

FIG. 2 is a flow diagram that depicts a process 200 for automatically tagging content items with skills, in an embodiment. Process 200 may be performed by modeling system 130.

At block 210, multiple skill classifiers are trained based on textual embeddings of content items and their respective labels. Some labels may be positive, indicating an association between the corresponding content item and the corresponding skill, while other labels may be negative, indicating that there is no association between the corresponding content item and the corresponding skill. Some of the training instances may have been the result of skill tag propagation and/or skill tag augmentation.

At block 220, a particular content item embedding is generated based on text from a particular content item. The text may be provided by a content provider that provided the particular content item.

At block 230, the particular content item embedding is applied to multiple skill classifiers to generate multiple results. Each result is from a different one of the skill classifiers. Each skill classifier corresponds to a different skill.

At block 240, one or more of the results are identified, each of which indicates that the corresponding skill is associated with the particular content item. For example, results from skill classifiers corresponding to, respectively, skills A, B, and C are identified.

At block 250, for each result of the one or more results, skill tagging data is stored that associates the particular content item with a skill that corresponds to the result. Given the above example, the particular content item is associated with (or tagged with) skills A, B, and C.

Blocks 220-250 may be repeated for other content items. Thus, the same set of skill classifiers is used with respect to content item embeddings of other content items.

The skill tagging data generated by process 200 may be stored in content delivery system 120 and leveraged by content delivery exchange 124 in presenting content through publisher system 130 to users of client devices 152-156.

Confident Skill Classifiers

In an embodiment, a confidence measure is computed for each of one or more skill classifiers. The confidence measure may be computed based on applying a skill classifier to its corresponding training data. For example, if there are twenty training instances for a skill model, ten positive instances and ten negative instances, and those training instances are input to the skill classifier to generate twenty scores, then those scores may be further analyzed. An aggregated (e.g., mean or median) score of the scores from the positive training instances may be computed as well as an aggregated (e.g., mean or median) score of the scores from the negative training instances. The difference between the two aggregated scores reflect a confidence measure. The greater the difference, the greater the confidence in the skill classifier.

In an embodiment, if a skill classifier has a confidence measure that is below a certain threshold, then the skill classifier is not used to tag content items.

In an embodiment, a content item is tagged with a particular skill if a score generated by the corresponding skill classifier is greater than a particular threshold. The particular threshold may be the same for all skill classifiers. Alternatively, the particular threshold may vary from one skill classifier to another. For example, a mean and a standard deviation is calculated for a skill classifier based on a set of scores from the positive training instances of the skill classifier. If the skill classifier generates a score (for a content item) that is greater than the mean plus the standard deviation, then the content item is tagged with the skill corresponding to the skill classifier. Otherwise, the content item is not tagged with that skill.

In an embodiment, "easy" training instances for a skill classifier are identified and removed and the skill classifier is retrained on the "hard" training instances and without any of the easy training instances. An easy training instance is one where the skill classifier is very confident in the corresponding score, such as a positive score greater than the "positive" mean (i.e., a mean based on only the positive training instances) plus the "positive" standard deviation or a negative score that is less than the "negative" mean (i.e., a mean based on only the negative training instances) minus the negative standard deviation.

Single Model Approach

The model-per-skill approach described above is useful where the amount of textual content associated with a content item is relatively large, such as a transcript of a 10-minute lecture. However, in some cases, a content item might not be associated with much text, such as when a transcript for the content item is missing or otherwise unavailable or when a content item contains little text and no audio or video. Such content items might not be able to benefit from the model-per-skill approach.

In the single model approach, a textual embedding (referred to herein as a "skill embedding") is generated for each candidate skill. Thus, if there are 8,000 skills in a skill taxonomy, then 8,000 skill embeddings may be generated. A skill embedding may be generated using one or more techniques, such as FastText (which is an open-source library that allows users to learn text representations and text classifiers and works on standard, generic hardware), word2vec, and GloVe (which is an unsupervised learning algorithm for obtaining vector representations for words).

A single model is trained based on multiple training instances, each training instance corresponding to a candidate skill-content item pair. The features of the single model reflect, for each candidate skill-content item pair, relationships between a skill embedding (of the candidate skill) and one or more token embeddings of (textual) tokens of the content item. The tokens of a content item may be part of a title or short description that accompanies the content item. A label for each training instance indicates whether the corresponding content item is about (e.g., teaches) the corresponding skill.

Different machine learning techniques may be used to train the model, such as logistic regression and gradient boosting. Gradient boosting is a machine learning technique for regression and classification problems and produces a prediction model in the form of an ensemble of "weak" prediction models, such as decision trees. Gradient boosting builds the model in a stage-wise fashion (similar to other boosting methods) and generalizes the weak prediction models by allowing optimization of an arbitrary differentiable loss function. XGBoost is an open-source software library that provides a gradient boosting framework for the C++, Java®, Python®, R, and *Julia* programming languages.

Once the model is trained, feature values computed for a candidate skill-content item pair are input to the model that computes a score that represents a likelihood that the skill of that pair is associated with the (e.g., limited) text of the content item. In an embodiment, token embeddings are not generated for certain words (e.g., stop words and/or common words) in a title/description of a content item, such as "this", "the", "a", and "about."

The relationships between a skill embedding and multiple token embeddings are reflected in multiple types of measures. Example types of measures include a dot product of a skill embedding and a token embedding, a cosine similarity of a skill embedding and a token embedding, and a Euclidean distance between a skill embedding and a token embedding.

Thus, if dot product is one type of measure that is used and there are five tokens of a content item available, then five dot products are calculated. Once multiple values for a type of measure are computed, multiple aggregation operations may be performed, such as maximum, minimum, average, median, $20^{th}$ percentile, $40^{th}$ percentile, etc. Such aggregation operations may be performed for each type of measure.

In an embodiment, the features of the model include different sets of aggregated values for different types of measures. For example, features of the single model may include maximum, median, and minimum dot product measures, maximum and median cosine similarity measures, and maximum and $20^{th}$ percentile Euclidean distances.

In an embodiment, some of the skill tagging of content items is performed manually. Skill tags for a content item may be used to create positive labels. Thus, a single content item may be the subject of multiple training instances, such as multiple positive training instances, multiple negative training instances, or at least one positive training instance and at least one negative training instance.

In an embodiment, skill tag augmentation and/or skill tag propagation are used to create one or more positive labels for a content item.

In an embodiment, negative labels are automatically generated by identifying, for a known skill tag (determined manually or automatically through skill tag augmentation or skill tag propagation), one or more skills that are very different from the skill of the known skill tag. Such identifying may involve leveraging a skill graph to ensure that two skills are not similar. Additionally or alternatively, skill embeddings of two skills may be used to determine whether the two skills are very different (e.g., in Euclidean distance or by cosine similarity). If so, then a negative label is found for both skills. For example, if a first skill is associated with a first content item and it is determined that a second skill is very different from the first skill, then a negative training instance for the first content item-second skill pair may be generated. Similarly, if the second skill is associated with a second content item, then a negative training instance for the second content item-first skill pair may be generated.

Process Overview

Figure 3:
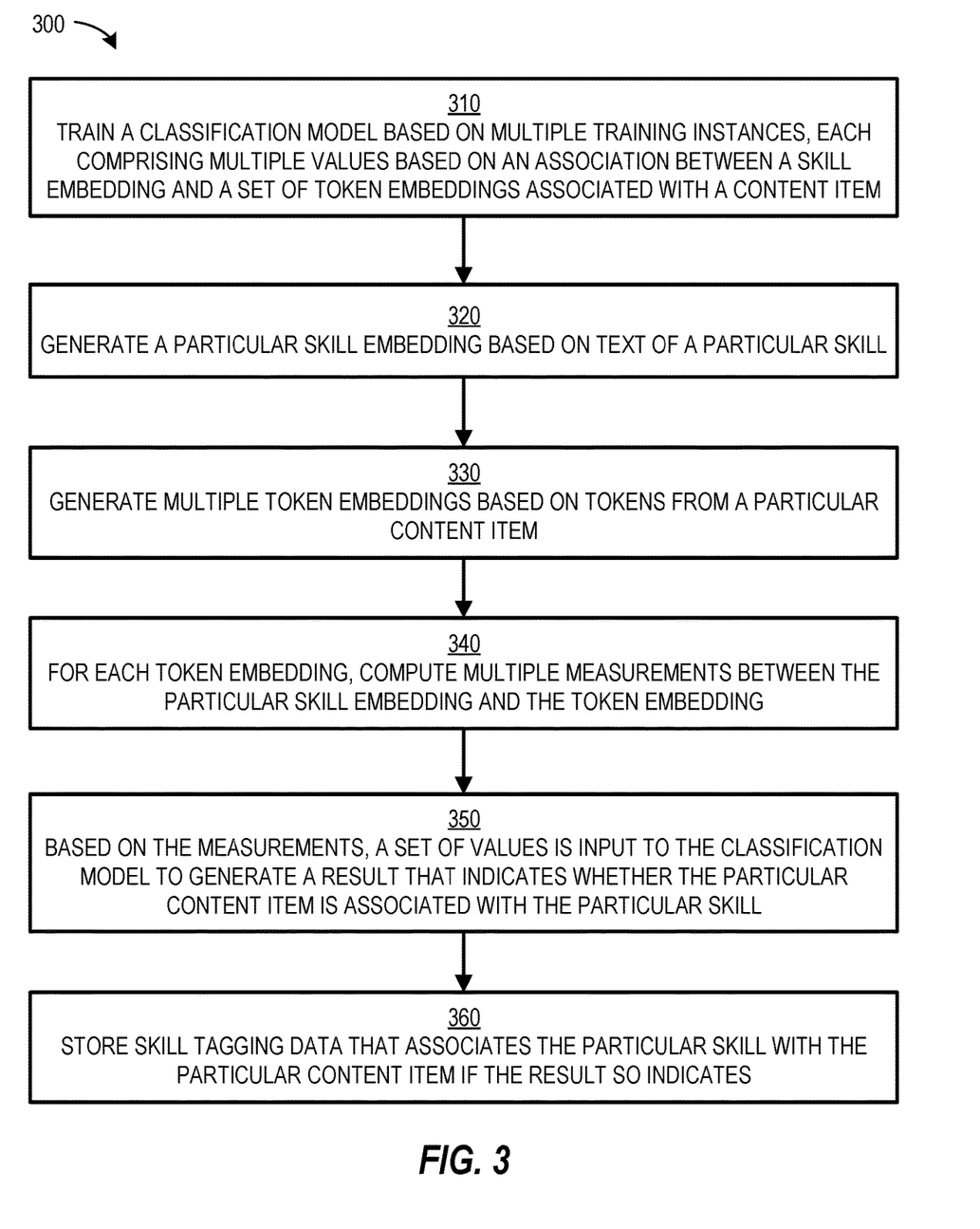
FIG. 3 is a flow diagram that depicts a process for automatically associating skills with content items using a different approach, in an embodiment.

FIG. 3 is a flow diagram that depicts a process 300 for automatically associating skills with content items using the single model approach, in an embodiment. Process 300 may be performed by modeling system 130.

At block 310, a classification model is trained based on multiple training instances, each training instance comprising multiple values based on an association between a skill embedding of a skill and a set of token embeddings associated with a content item.

At block 320, a particular skill embedding is generated based on text of a particular skill. For example, "insurance" is a skill and an embedding (e.g., a three-hundred dimension vector) representing the skill is generated.

At block 330, multiple token embeddings are generated based on tokens from a particular content item, such as a title or a short description of a video, audio, a graphic, or a textual content item. Continuing with the above example, a title of a content item is "HMO Tutorial." Thus, an embedding is generated for "HMO" and an embedding is generated for "Tutorial." In a variation of this example, a short description of the content item may be "This video is a tutorial about HMOs." In this example, a token embedding may be generated for each token in the short description.

At block 340, for each token embedding, multiple measurements are computed between the particular skill embedding and the token embedding. For example, a cosine similarity is computed for each particular skill embedding-token embedding pair.

At block 350, a set of values that are based on the measurements are input to the classification model to generate a result that indicates whether the particular content item is associated with the particular skill. For example, the set of values may be a maximum of the computed cosine similarities, a minimum of the computed cosine similarities, and a median of the computed cosine similarities.

At block 360, skill tagging data are stored that associate the particular skill with the particular content item if the result so indicates.

Blocks 320-360 may be repeated for different pairs of content items and skills. Thus, the classification model may be leveraged for the same content item across multiple skills. Similarly, the classification may be leveraged for different content items relative to the same skill.

The skill tagging data generated by process 300 may be stored in content delivery system 120 and leveraged by content delivery exchange 124 in presenting content through publisher system 130 to users of client devices 152-156.

Content Item Recommendations

Once media items and other content items are associated with skill tags, those skill tags may be leveraged in one or more ways. For example, a user subscribes to be notified regarding content items that are associated with a particular skill that the user desires to develop. Content delivery system 120 determines which content items teach the particular skill based on skill tags associated with those content items. After identifying a set of content items that are associated with the particular skill, content delivery system 120 causes information about one or more content items in the set to be delivered to a computing device of the user for presentation (e.g., display), which might occur when the user next logs into content delivery system 120 or which might occur immediately through email or other messaging service. The information may be in the form of one or more recommendations.

As another example, a user views a job posting that requires a particular skill. Publisher system 140 determines that the user viewed the job posting and informs content delivery system 120, which determines that the user does not list the particular skill in his/her profile. In response, content delivery system 120 identifies a set of candidate content items that are associated with the particular skill. One or more of the content items in the set may have been associated with the particular skill due to one of the machine-learning approaches described herein. Content delivery system 120 selects one of the content items in the set based on one or more selection criteria (e.g., user ratings of the content items, respective length of the content items, popularity of the content items, and/or one or more attributes of the content providers of the content items) and causes the selected content item (or information about the content item) to be presented to the user through a computing device of the user.

Skill Suggestions

In an embodiment, a content item that is uploaded by a content provider to content delivery system 120 is automatically scored using one of the two main approaches described above: the multi-model approach or the single model approach. The type of content item that is being uploaded may dictate which approach is used. Regardless of the approach used, the content item is analyzed to determine which skills should be associated with the content item. Content delivery system 120 (e.g., through content provider interface 122) then presents one or more skills to the content provider. The content provider is provided the option to confirm or reject the skills as a whole or confirm/reject the skills individually.

Improvement to Computer-Related Technology

Techniques described herein represent an improvement to computer-related technology involved in tagging content items, such as videos, documents, and other types of content. Current skill tagging techniques (such as keyword matching) either identify too many candidate skills or not the right skills. With more accurately tagged content items, more relevant recommendations may be presented to end users.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
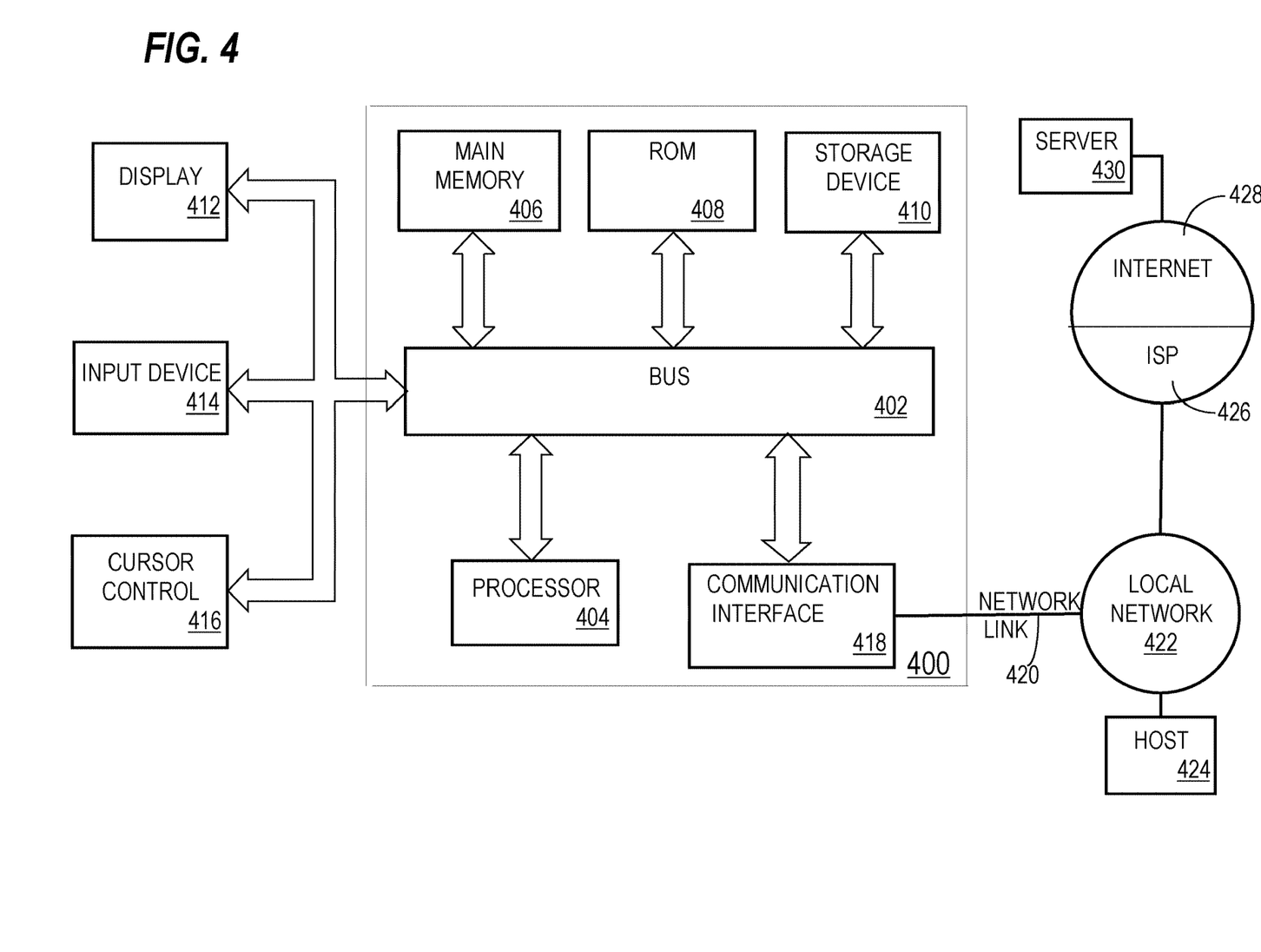
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical disks, magnetic disks, or solid-state drives, such as storage device 410. Volatile media include dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media are distinct from but may be used in conjunction with transmission media. Transmission media participate in transferring information between storage media. For example, transmission media include coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    training a plurality of classification models, wherein the plurality of classification models comprises a separate classification model for each skill tag of a plurality of different skill tags, each skill tag represents a different skill, an output of each classification model of the plurality of classification models corresponds to a different skill tag of the plurality of skill tags, and each classification model is trained based on textual embeddings of a different plurality of content items and labels indicating whether each content item is associated with the different skill tag that corresponds to said each classification model;
    when a text transcript is associated with a particular content item that contains at least one of audio and video, (i) generating a particular content item embedding based on text from the text transcript associated with the particular content item, (ii) applying the particular content item embedding to each of the plurality of classification models to generate a plurality of results, (iii) identifying one or more results of the plurality of results that indicate that one or more corresponding skill tags are associated with the particular content item, and (iv) for each result of the plurality of results, storing skill tagging data that associate the particular content item with a particular skill tag that corresponds to said each result;
    when a text transcript is not associated with the particular content item that contains at least one of audio data and video data, (i) generating the particular content item embedding based on a token associated with the particular content item, (ii) generating a plurality of similarity metrics based on the particular content item embedding and a skill embedding, and (iii) applying the plurality of similarity metrics to a particular classification model of the plurality of classification models to generate a result that indicates whether the particular content item is associated with the particular skill;
    wherein the method is performed by one or more computing devices.

2. The method of claim 1, further comprising, prior to generating the particular content item embedding:
    determining that a first skill tag is associated with a first content item;
    identifying a second skill tag that is similar to the first skill tag; and
    generating a particular training instance that associates the first content item with the second skill tag;
    wherein training the plurality of classification models comprises training a classification model that corresponds to the second skill tag based on the particular training instance.

3. The method of claim 2, wherein identifying the second skill tag that is similar to the first skill tag comprises:
    generating a skill graph that comprises a plurality of skill associations;
    wherein identifying the second skill tag as similar to the first skill tag is based on a skill tag association in the skill graph.

4. The method of claim 1, further comprising, prior to generating the particular content item embedding:
    determining that a first content item is similar to a second content item;
    identifying one or more first skill tags that are associated with the first content item;
    in response to determining that the first content item is similar to the second content item, associating the one or more first skill tags with the second content item; and
    for each skill tag of the one or more first skill tags:
        generating a training instance that associates the second content item with said each first skill tag, wherein training the plurality of classification models comprises training a classification model that corresponds to each first skill tag based on the training instance.

5. The method of claim 4, wherein determining that the first content item is similar to the second content item comprises:
    generating a first textual embedding for the first content item;
    generating a second textual embedding for the second content item; and
    performing an operation that takes the first textual embedding and the second textual embedding as input;
    wherein determining that the first content item is similar to the second content item is based on a result of the operation.

6. The method of claim 1, further comprising:
    based on the skill tagging data that associate the particular content item with the particular skill tag, causing recommendation data about the particular content item to be presented to a particular user.

7. The method of claim 6, further comprising:
    receiving, from a computing device of the particular user, preference data that indicate an interest by the particular user in the particular skill tag;
    wherein causing the recommendation data to be presented to the particular user is also based on the preference data.

8. A method comprising:
generating a first skill embedding based on first text of a first skill tag of a skill taxonomy that is based on one or more user-provided skills;
extracting a first plurality of tokens from a first content item that includes at least one of audio and video and does not have an associated transcript;
generating a first plurality of token embeddings based on the first plurality of tokens;
for each token embedding of the first plurality of token embeddings:
    computing a first plurality of measurements between the first skill embedding and said each token embedding;
based on the first plurality of measurements, applying a first set of values to a classification model trained using training data that correspond to the first skill tag;
generating, by the classification model, a confidence score; and
when the confidence score is greater than a particular threshold, storing first skill tagging data that associate the first skill tag with the first content item;
wherein the method is performed by one or more computing devices.

9. The method of claim 8, wherein the first plurality of measurements include one or more of:
a dot product of the first skill embedding and said each token embedding,
a cosine similarity of the first skill embedding and said each token embedding, or
a Euclidean distance between the first skill embedding and said each token embedding.

10. The method of claim 9, wherein the first set of values includes one or more of:
a maximum of a subset of the first plurality of measurements,
a minimum of the subset of the first plurality of measurements,
a median of the subset of the first plurality of measurements, or
a mean of the subset of the first plurality of measurements.

11. The method of claim 10, wherein the subset is a first subset that is different from a second subset of the first plurality of measurements,
wherein the first set of values includes one or more of:
a maximum of the second subset of the first plurality of measurements,
a minimum of the second subset of the first plurality of measurements,
a median of the second subset of the first plurality of measurements, or
a mean of the second subset of the first plurality of measurements.

12. The method of claim 8, further comprising:
generating a plurality of training instances, each of which comprises multiple measurements between a skill embedding and multiple token embeddings of a content item; and
training the classification model based on the plurality of training instances.

13. The method of claim 12, wherein generating the plurality of training instances comprises:
determining that a second skill tag is associated with a second content item;
identifying a third skill tag that is similar to the second skill tag;
generating a second skill embedding based on second text of the third skill tag;
generating a second plurality of token embeddings based on a second plurality of tokens from the second content item;
for each token embedding of the second plurality of token embeddings:
    computing a second plurality of measurements between the second skill embedding and said each token embedding; and
generating a particular training instance that comprises a second set of values that are based on a second plurality of measurements;
wherein the plurality of training instances includes the particular training instance.

14. The method of claim 12, wherein generating the plurality of training instances comprises:
determining that a second content item is similar to a third content item;
identifying one or more skill values that are associated with the second content item;
in response to determining that the second content item is similar to the third content item, associating the one or more skill values with the third content item;
for each skill tag of the one or more skill tags:
    generating a second skill embedding based on second text of said each skill tag;
    generating a second plurality of token embeddings based on a second plurality of tokens from the third content item;
    for each token embedding of the second plurality of token embeddings:
        computing a second plurality of measurements between the second skill embedding and said each token embedding; and
    generating a training instance that comprises a second set of values that are based on the second plurality of measurements;
wherein the plurality of training instances includes the training instance.

15. The method of claim 12, further comprising:
generating a skill graph that comprises a plurality of skill associations;
wherein generating the plurality of training instances comprises:
determining that a second skill tag is associated with a second content item;
determining, based on the skill graph, that a third skill tag is not similar to the second skill tag;
generating a second skill embedding based on second text of the third skill tag;
generating a second plurality of token embeddings based on a second plurality of tokens from the second content item;
for each token embedding of the second plurality of token embeddings:
    computing a second plurality of measurements between the second skill embedding and said each token embedding;
generating a particular training instance that comprises (1) a label indicating that the second content item is not associated with the third skill tag and (2) a second set of values that are based on a second plurality of measurements;
wherein the plurality of training instances includes the particular training instance.

16. The method of claim 8, further comprising:
generating a second skill embedding based on second text of a second skill tag;
for each token embedding of the first plurality of token embeddings:
  computing a second plurality of measurements between the second skill embedding and said each token embedding;
applying the second plurality of measurements to the classification model to generate a result that indicates whether the first content item is associated with the second skill tag; and
storing second skill tagging data that associate the second skill tag with the first content item if the result indicates that the first content item is associated with the second skill.

17. One or more storage media storing instructions which, when executed by one or more processors, cause:
training a plurality of classification models, wherein the plurality of classification models comprises a separate classification model for each skill tag of a plurality of different skill tags, an output of each classification model of the plurality of classification models corresponds to a different skill tag of the plurality of skill tags, and each classification model is trained based on textual embeddings of a different plurality of content items and labels indicating whether each content item is associated with the different skill tag that corresponds to said each classification model;
when a length of text associated with a particular content item that contains at least one of audio and video is greater than a threshold, (i) generating a particular content item embedding based on the text from the particular content item, (ii) applying the particular content item embedding to each of the plurality of classification models to generate a plurality of results, (iii) identifying one or more results of the plurality of results that indicate that one or more corresponding skill tags are associated with the particular content item, and (iv) for each result of the one or more results, storing skill tagging data that associates the particular content item with a particular skill tag that corresponds to said each result.

18. The one or more storage media of claim 17, wherein the instructions, when executed by the one or more processors, further cause, prior to generating the particular content item embedding:
determining that a first skill tag is associated with a first content item;
identifying a second skill tag that is similar to the first skill tag; and
generating a particular training instance that associates the first content item with the second skill tag;
wherein training the plurality of classification models comprises training a classification model that corresponds to the second skill tag based on the particular training instance.

19. The method of claim 18, wherein identifying the second skill tag that is similar to the first skill tag comprises:
generating a skill graph that comprises a plurality of skill associations;
wherein identifying the second skill tag as similar to the first skill tag is based on a skill association in the skill graph.

20. The one or more storage media of claim 17, wherein the instructions, when executed by the one or more processors, further cause, prior to generating the particular content item embedding:
determining that a first content item is similar to a second content item;
identifying one or more skill tags that are associated with the first content item;
in response to determining that the first content item is similar to the second content item, associating the one or more skill tags with the second content item; and
for each skill tag of the one or more skill tags:
  generating a training instance that associates the second content item with said each skill tag, wherein training the plurality of classification models comprises training a classification model that corresponds to said each skill tag based on the training instance.

\* \* \* \* \*